UNITED STATES PATENT OFFICE 2,040,491

RUBBER COMPOSITION AND METHOD OF PRESERVING RUBBER

Werner M. Lauter, Cuyahoga Falls, Ohio, assignor to Wingfoot Corporation, Wilmington, Del., a corporation of Delaware No Drawing. Application July 13, 1933,
Serial No. 680,257

8 Claims. (Cl. 18—50)

This invention relates to a new class of age resisting compounds suitable for incorporation as antioxidants in rubber and other deteriorable compositions. The substances comprising the class in question have been found by numerous tests to protect rubber against deterioration from such influences as heat, light and oxygen. They have also been found to materially enhance the resistance of rubber to deterioration by flexing. In addition, they impart other desirable properties, such as improved tensile strength, to the vulcanized product.

Substances which may be employed as antioxidants in accordance with the teachings of the invention are alkyl diaryl amines of the following type formula:

$R_1$ and $R_2$ being aryl and R being an alkyl group, the sum total of the carbon atoms of R, $R_1$ and $R_2$ being at least fourteen. Thus, when one of the aryl groups contains seven or more carbon atoms, such as is the case for example with tolyl, xylyl and naphthyl groups, R may be any alkyl group. And, when R contains at least two carbon atoms, both $R_1$ and $R_2$ may be phenyl groups. Particularly illustrative of the invention are N-butyl ditolyl amine containing eighteen carbon atoms, N-butyl diphenyl amine containing sixteen carbon atoms and N-methyl phenyl beta naphthylamine, containing seventeen carbon atoms.

Others are N-ethyl phenyl alpha naphthylamine, N-ethyl phenyl beta naphthylamine, N-isopropyl phenyl (alpha or beta) naphthylamine, N-butyl phenyl (alpha or beta) naphthylamine, N-amyl phenyl (alpha or beta) naphthylamine, N-methyl o- or p-tolyl alpha naphthylamines, N-methyl o- or p-tolyl beta naphthylamines, N-ethyl o- or p-tolyl alpha naphthylamines, N-ethyl o- or p-tolyl beta naphthylamines, N-isopropyl o- or p-tolyl alpha naphthylamines and N-isopropyl o- or p-tolyl beta naphthylamines.

Still others are the N-butyl o- or p-tolyl alpha naphthylamines, N-butyl o- or p-tolyl beta naphthylaminer, N-amyl o- or p-tolyl alpha naphthylamines, N-amyl o- or p-tolyl beta naphthylamines, N-alkyl xylyl naphthylamines, N-ethyl diphenyl amine, N-isopropyl diphenyl amine, N-amyl diphenyl amine, N-methyl o- or p-tolyl anilines, N-ethyl o- or p-tolyl anilines, N-isopropyl o- or p-tolyl anilines, N-butyl o- or p-tolyl anilines, N-amyl o- or p-tolyl anilines, N-alkyl xylyl anilines and N-alkyl xylyl toluidines.

The antioxidants described may be prepared according to any of the well known chemical processes. One such process which has been found to be very efficient and to give compounds of high purity is the Leuckert-Wallach reaction described in Annalen 343, pages 54 to 74. In this process an amine is reacted under pressure with a hydrocarbon carbonyl compound in the presence of formic acid at such a temperature that the formic acid acts as a reducing agent. When employing starting materials in the lower molecular weight range, the products obtained are generally definite tertiary amines while in the case of the more complex carbonyls and amines, other reaction products of unknown constitution are formed. These latter materials, also excellent antioxidants, are claimed in my copending application Serial No. 680,258, filed July 13, 1933.

Exemplary of determinable compounds which may be produced by employing the above reaction is N-isopropyl diphenyl amine prepared by autoclaving 250 grams of diphenyl amine, 105 grams of acetone and 80 grams of formic acid for 2 hours at 180 degrees C. The product, after being washed with sodium carbonate solution, dried and distilled in vacuo, has a boiling point of from 156 to 159 degrees C. at 7 mm. pressure. Similarly, N-isopropyl phenyl beta naphthylamine may be prepared by reacting phenyl beta naphthylamine with acetone in the presence of formic acid.

Any other suitable method of preparation may, of course, be employed. For instance, tertiary methyl phenyl beta naphthylamine may be prepared by autoclaving 1 mol. of phenyl beta naphthylamine and approximately 3 mols of methanol, together with 2 grams of iodine as a catalyst, for 6 hours at a temperature ranging from 240 to 280 degrees C., subsequently distilling the product. Butyl diphenyl amine may be prepared by an analogous method from diphenyl amine and butyl alcohol. Other possible methods of preparation include the reacting of an alkyl halide with a secondary aromatic amine, a dialkyl sulfate with a secondary aromatic amine, an alkyl ester of toluene sulfonic acid with a secondary aromatic amine, and an aryl amine with a secondary alkyl aryl amine. It is to be understood that the invention is not limited to any specific method of preparing the antioxidants.

Conveniently, these materials may be compounded in a rubber stock having the following formula:

| | Parts |
|---|---|
| Extracted pale crepe | 100 |
| Zinc oxide | 5 |
| Sulfur | 3 |
| Hexamethylene tetramine | 1 |
| Stearic acid | 1.5 |
| Antioxidant | 1 |

Samples prepared in accordance with the foregoing formula, different antioxidants being employed, were subjected to vulcanization for varying periods of time and then tested to ascertain their physical characteristics. One set from each type of stock was tested immediately for tensile strength and elasticity while a second set was subjected to ageing in a Bierer-Davis bomb for 6 days in oxygen at 50 degrees C. and 150 pounds per square inch pressure. At the conclusion of the 6 day period, the samples were removed from the bomb and subjected to physical tests corresponding to those conducted upon the unaged samples. It is evident from the following tables that rubber compositions containing even small proportions of the antioxidants of this invention resist deterioration remarkably well. Similar compositions not containing the antioxidants, on being subjected to corresponding tests, increase in weight in the neighborhood of ten percent and lose almost all their tensile and elongation properties.

| Cure in min./°F. | Tens. kg./cm.$^2$ | Elong. percent | Stress kg./cm.$^2$ at | | Percent weight increase |
|---|---|---|---|---|---|
| | | | 500 percent | 700 percent | |
| *N-methyl phenyl beta naphthylamine* | | | | | |
| Original | | | | | |
| 35/285 | 96 | 850 | 15 | 41 | |
| 50 | 114 | 815 | 17 | 56 | |
| 70 | 142 | 760 | 27 | 97 | |
| Aged | | | | | |
| 35/285 | 103 | 825 | 15 | 50 | .06 |
| 50 | 116 | 785 | 19 | 69 | .13 |
| 70 | 129 | 735 | 25 | 102 | .10 |
| *N-butyl diphenylamine* | | | | | |
| Original | | | | | |
| 35/285 | 89 | 940 | 9 | 22 | |
| 50 | 116 | 860 | 14 | 43 | |
| 70 | 131 | 810 | 19 | 65 | |
| Aged | | | | | |
| 35/285 | 86 | 860 | 12 | 33 | .17 |
| 50 | 103 | 825 | 16 | 49 | .26 |
| 70 | 106 | 755 | 21 | 75 | .32 |
| *N-isopropyl diphenyl amine* | | | | | |
| Original | | | | | |
| 35/285 | 116 | 910 | 12 | 36 | |
| 50 | 115 | 825 | 17 | 55 | |
| 70 | 139 | 785 | 23 | 80 | |
| Aged | | | | | |
| 35/285 | 68 | 825 | 12 | 34 | .41 |
| 50 | 83 | 785 | 17 | 50 | .60 |
| 70 | 100 | 730 | 24 | 80 | .48 |

| Cure in min./°F. | Tens. kg./cm.$^2$ | Elong. percent | Stress kg./cm.$^2$ at | | Percent weight increase |
|---|---|---|---|---|---|
| | | | 500 percent | 700 percent | |
| *N-isopropyl phenyl beta naphthylamine* | | | | | |
| Original | | | | | |
| 35/285 | 92 | 870 | 12 | 34 | |
| 50 | 115 | 825 | 17 | 56 | |
| 70 | 139 | 795 | 21 | 78 | |
| Aged | | | | | |
| 35/285 | 101 | 840 | 15 | 46 | .06 |
| 50 | 116 | 795 | 20 | 66 | .17 |
| 70 | 132 | 750 | 25 | 90 | |

From the foregoing it is apparent that the compounds herein disclosed are highly suitable for antioxidants in rubber and other products which deteriorate under the influence of heat, light and oxygen. Not only do these compounds counteract the effect of such influences, but they tend to impart other highly desirable qualities, such, for example, as increased resistance to deterioration by flexing. It will be apparent that numerous changes may be made in the procedure to be followed and the chemicals employed without departing from the inventive concept. It is intended that the patent shall cover, by suitable expression in the appended claims, whatever features of patentable novelty reside in the invention.

What I claim is:

1. A method of preserving rubber which comprises subjecting it to vulcanization in the presence of tertiary N-methyl phenyl beta naphthylamine.

2. A method of preserving rubber which comprises subjecting it to vulcanization in the presence of a tertiary N-alkyl aryl naphthylamine.

3. A method of preserving rubber which comprises subjecting it to vulcanization in the presence of a tertiary alkyl phenyl naphthylamine.

4. A rubber product that has been vulcanized in the presence of a tertiary N-alkyl aryl naphthylamine.

5. A rubber product that has been vulcanized in the presence of N-methyl phenyl beta naphthylamine.

6. A rubber product that has been vulcanized in the presence of a tertiary N-alkyl phenyl naphthylamine.

7. A method of preserving rubber which comprises subjecting it to vulcanization in the presence of a tertiary N-alkyl dinaphthylamine.

8. A rubber product that has been vulcanized in the presence of a tertiary N-alkyl dinaphthylamine.

WERNER M. LAUTER.